Aug. 18, 1925.
C. P. RANDOLPH
1,550,046
VEHICLE SPRING
Filed March 1, 1922
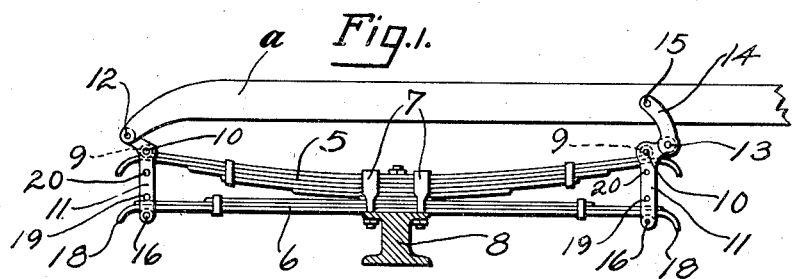
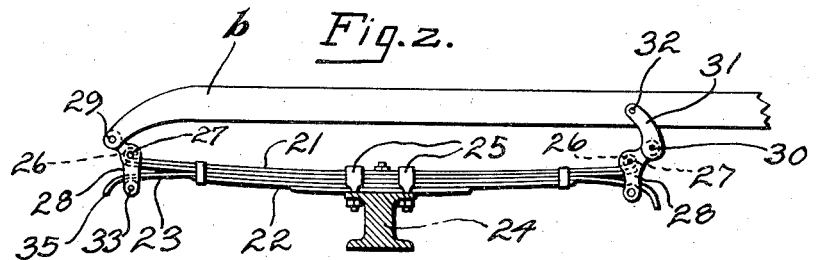
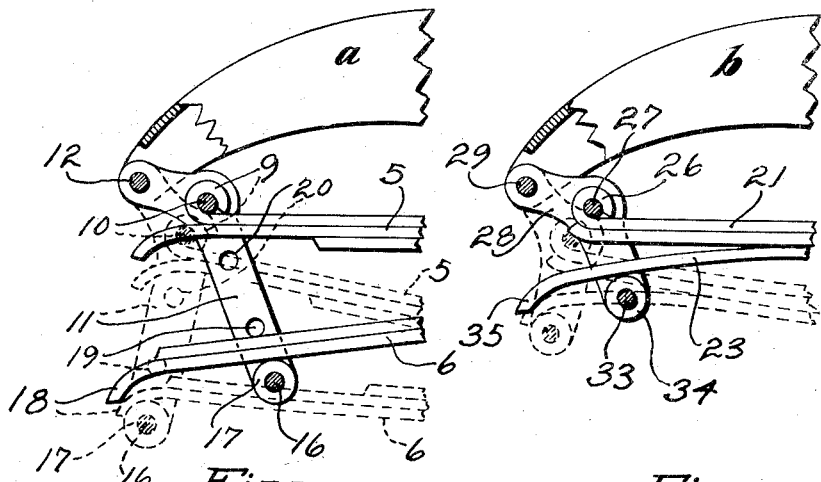
INVENTOR
CLABORN P. RANDOLPH
BY Lyon & Lyon
ATTORNEYS.

Patented Aug. 18, 1925.

1,550,046

UNITED STATES PATENT OFFICE.

CLABEORN P. RANDOLPH, OF LOS ANGELES, CALIFORNIA.

VEHICLE SPRING.

Application filed March 1, 1922. Serial No. 540,130.

*To all whom it may concern:*

Be it known that I, CLABEORN P. RANDOLPH, a citizen of the United States, residing at Los Angeles, in the county of Los Angeles and State of California, have invented a new and useful Vehicle Spring, of which the following is a specification.

This invention relates to that type of vehicle spring whereby both lighter and heavier loads are yieldingly supported so that all shocks and vibrations are efficiently absorbed. With the ordinary vehicle spring, it is well konwn that if they are stiff enough to properly support a heavy load, relatively light shocks and vibrations will be transmitted to the chassis when the vehicle is but lightly loaded and is travelling over inequalities of the road. This new spring is constructed so that the lighter loads and shocks will be borne by a lighter and weaker section or member of the spring, while the heavier loads and shocks will be absorbed by a heavier and stiffer section or member of the spring.

The spring is so constructed that, when the load is increased beyond that which can be supported by the lighter spring section, the lighter section will be engaged by an area of the heavier section that increases proportionately with the increase in load.

Another object is to provide a construction that will permit torsion of the spring which permits of side sway of the chassis and body of the vehicle.

Another object is to provide a shackle which is more or less free to swing at right angles to the direction of the force tending to compress the spring so that irregularities in the road surface, that would otherwise produce vibrations of the spring and would be transmitted to the chassis, will be absorbed by a pendulum like vibration of the shackle.

The form of shackle employed by me provides for differential motion between a portion of the spring and the chassis.

Another object is to provide for equalization in the movement of the spring. This result is achieved by having two spring sections connected at their middle portions and opposing one another at their ends.

Another object is to provide a form of shackle which will prevent a jerk upon the chassis when the clutch is thrown in.

A further object is to provide a construction which will insure to a maximum degree against breakage of the spring in service.

Other objects and advantages will appear hereinafter.

The accompanying drawings illustrate two forms in which the invention at present is embodied.

Figure 1 is a side elevation of one form of spring constructed in accordance with the invention and attached to a chassis which is fragmentarily shown, a vehicle axle being shown in section.

Fig. 2 is a view similar to Figure 1 showing a different form of the invention.

Fig. 3 is an enlarged detail of the left end of Figure 1, portions being shown in section.

Fig. 4 is an enlarged detail of the left end of Figure 2, portions being shown in section.

The form of the invention shown in Figures 1 and 3 will first be described. There is provided an upper spring section or member 5 and a lower spring section or member 6, and each of said sections may be formed of any desired number of leaves. The upper spring section preferably has more spring leaves than the lower section so as to be heavier and stiffer. The leaves of the upper section are graduated in length from the shortest at the bottom to the longest which is next the top leaf. Also the leaves of the bottom section are graduated, the shortest being on top and the longest on the bottom. The leaves are all held assembled by the U-clips 7 and said clips are secured to the vehicle axle indicated at 8.

The spring leaves are constructed and assembled so that the spring section 5 tends to expand upwardly at its ends, and the spring section 6 tends to expand downwardly at its ends. Thus the spring sections oppose one another. The upper leaf of the section 5 is provided at its opposite ends with eyes 9 to receive shackle pivots 10. Each pivot 10 constitutes a fulcrum for a shackle 11 which in this instance is a lever of the first class. In the instance shown each lever 11 is formed by a pair of members embracing the spring sections between them. The levers 11 are of the bell-crank type and one is pivoted at 12 to the downwardly bent end of the chassis frame *a* and the other is pivoted at 13 to a link 14 that is pivoted at 15 to the frame. It is obvious, without the necessity of further illustration, that the link 14 could be omitted and the associated lever pivoted instead to the frame *a* instead of being pivotally connected thereto through the link.

The lower ends of the levers 11 are provided with pins 16 on which are journaled rollers 17. The end portions of the spring section 6 rest upon the rollers 17 which thus constitute seats, and when the spring parts are being assembled the sections 5, 6 will be compressed or pinched together somewhat before the shackles are secured in place. Because of the pivots 12, 13 being out of alinement with the pivots 9 and pins 16, it is clear that whatever motion the shackles are subjected to relative to the spring members will be a swinging or pendulum like movement.

When the spring is in use and the axle is forced upwardly by reason of the wheel on the axle meeting an obstruction, the shackles will be swung inwardly at their lower ends to produce a pinching together of the end portions of the spring sections 5, 6 as clearly shown in solid lines in Figure 3. If the shock is comparatively light it will be understood that it will be absorbed by the weaker spring section 6, but if the shock be comparatively great the spring section 6 will be compressed sufficiently to engage the upper and stiffer spring section between the clips 8 and levers 11. The more the spring is compressed, the greater the area of contact will be between the spring sections. The area of contact will be more or less proportionate to the load. Thus under greater shocks and loads the upper spring section will bear against and reinforce the lower spring section.

Because of the swinging motion of the shackles 11 and the differential motion or shiftable connection between them and the spring section 6, considerable up and down relative motion between the axle and chassis frame can take place without material compression of the spring section 6, that is to say the translation of the vertical motion by the shackles into a horizontal motion reduces the length of compressive movement upon the weaker spring section 6. Thus the spring section 6 has more time to return to its normal condition after each compression, and the more efficiently prevent the vibration of the axle from reaching the chassis.

It may now be assumed that the wheel has passed over the obstruction, thus permitting the spring to expand. This expansion will cause the shackles to swing outwardly as indicated for one of them in dotted lines in Figure 3. This again produces a pinching together of the outer ends of the spring sections 5, 6 and the resistance of the sections to this pinching aids in absorbing the rebound or back lash of the spring. There is considerable differential motion as the shackles swing from one position to the other and also a reduction of the motion between the axle and frame through the lever construction. Thus the spring within itself is a rebound absorber to a considerable degree.

It is preferable to form the extremities of the lower leaf of the section 6, with downwardly bent or curved portions 18 adapted to engage the rollers when the lower ends of the levers are swung sufficiently far as clearly shown in Figure 3. The effect of this is to gradually increase the pinching effect of the spring so as to produce a comparatively great resistance to further expansion of the spring upon the rebound action.

It will be noted that, because of the construction of the spring in two sections, with the end portions of the sections separated a material distance, there is a self-bracing effect produced on the spring tending to prevent torsion of the spring such as would permit dangerous side sway of the chassis.

The levers 11 are provided with a plurality of holes 19 so that the pin 16 may be adjustably positioned along the lever, the farther up the pin being adjusted the greater the tensioning of the spring section 6 to stiffen it against load and shock.

In event of the spring section 5 breaking, the spring may be temporarily repaired by raising the outer ends of the spring section 6 to position just beneath the pivots 9, and placing a bolt, not shown, in holes 20 formed in the shackles 11 a comparatively short distance below the pivots 9. The broken section 5 will then be continuously supported by the section 6 after the manner of its coordination with the section 6 when comparatively great loads and shocks are met with by the unbroken spring.

Now referring to the form of the invention illustrated in Figures 2 and 4, there is provided an upper spring section or member 21, a lower spring section or member 22 and an intermediate spring section member 23. It is understood that each of the sections may comprise any desired number of leaves. In the instance shown the section 21 comprises two leaves, the section 23 one leaf, and the section 22 two leaves. The sections are held assembled and secured to the axle 24 by U-clips 25.

The uppermost leaf section 21 is provided at its ends with eyes 26, to which are fulcrumed at 27 shackles in the form of bell-crank levers 28 similar in construction to the bell-crank levers 11. One of the shackles 28 is pivoted at 29 to the chassis frame *b* and the other shackle is pivoted at 30 to a link 31 that is pivoted at 32 to the frame *b*.

In manufacturing the spring sections, the sections 21, 22 will be constructed to expand upwardly and the section 23 will be constructed to expand downwardly away from the section 21, at least at its end portions. Thus the section 23 corresponds in function to the section 6 above described.

The shackles 28 carry pins 33 on which are journaled rollers 34. The rollers 34 constitute seats upon which the end portions of the spring section 23 rest. The section 23 terminates in downwardly bent or curved portions 35 corresponding in function to the portions 18 above described.

The spring illustrated in Figures 2 and 4 functions in precisely the same manner as the spring shown in Figures 1 and 3, and it will be readily understood that the only differences are the proportions and arrangement of the spring leaves of the several sections and the relative proportions of the levers 28.

It will be clear that, in the operation of the springs described above, the jerk produced on the axle by throwing in of the clutch when the engine is operating, will be absorbed because of the differential motion or shiftable connection between the shackles and the spring section 6 or 23 as the case may be. However, the longitudinal movement of the spring relative to the chassis is gradually overcome since, when the shackles 11 are caused to swing, said shackles function to compress the spring section 6 or 23, as the case may be.

It will be observed that the lower arms of the levers 11 and 28 hang pendulum-like from their fulcrums and that, because of the provision of the seats 17, 34, there is provided a sliding motion or shiftable connection of the levers and one of the spring sections. Though it is preferable to employ rollers for this purpose, it is to be understood that the connection to permit of movement of the levers lengthwise of the spring section that bears upon the rollers can be effected in any other desired manner.

It will be readily understood from the above description of operation of the spring that the member 6 or 23, as the case may be, yieldingly holds one end of the bell-crank lever against swinging, and that the resistance offered increases with the amount of deflection of the lower arm of the lever from the vertical.

Because of the lower arms of the levers 11, 28 being vertical when the spring is normal, very slight vibrations, to which the axle is constantly subjected even when the vehicle is running upon comparatively smooth roadways, will be absorbed by an almost imperceptible flexure of the spring, since the spring sections 6 and 23 are normally substantially at right angles to said vertical lever arms.

I claim:

1. In a vehicle spring, the combination of a spring member, a bell crank lever fulcrumed on one end of the spring member, the lower arm of the lever being vertical when the spring is normal, and a second spring member yieldingly holding the vertical arm of the lever against swinging in opposite directions from a neutral position, the second spring member being normally substantially at right angles to the vertical lever arm.

2. In a vehicle spring, the combination of a spring member, a bell-crank lever fulcrumed on one end of the spring member, and a second spring member, said spring members being constructed to expand away from each other at their ends and the lever being provided with a seat that is in shifting contact with the second spring member and that is moved toward and from the center of the second spring member by swinging of the lever in opposite directions.

3. In a vehicle spring, spring leaves secured together and constructed and assembled to effect expansion of one end of one of the leaves away from the other leaves, and a lever fulcrumed on one of the leaves and shiftably engaging another of the leaves whose expansion is opposed thereto.

4. The combination with an axle and a chassis, of spring members mounted on the axle, a bell crank lever fulcrumed on one end of one of the spring members and having one end pivotally connected to the chassis, and the other end of the lever having a seat adapted to move along the other spring member as the lever swings on its fulcrum, said other spring member yieldingly resisting the swinging movement of the lever in either direction.

5. The combination with an axle and chassis, of a spring member mounted on the axle, a bell crank lever fulcrumed on one end of the spring member and having its upper end pivotally connected with the chassis and normally extending aslant upwardly away from the spring member, the other end of the lever normally extending vertically downward from the spring member, and a spring normally at substantially right angles to the vertical lever arm and yieldingly resisting the lower end of the lever swinging in opposite directions.

Signed at Los Angeles, California this 21st day of February 1922.

CLABEORN P. RANDOLPH.